US012724204B2

(12) United States Patent
Dupoy et al.

(10) Patent No.: US 12,724,204 B2
(45) Date of Patent: Sep. 1, 2026

(54) PHOTONIC CHIP AND INFRARED IMAGING SYSTEM USING SUCH A PHOTONIC CHIP

(71) Applicant: COMMISSARIAT A L'ENERGIE ATOMIQUE ET AUX ENERGIES ALTERNATIVES, Paris (FR)

(72) Inventors: Mathieu Dupoy, Coublevie (FR); Cyrielle Monpeurt, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 237 days.

(21) Appl. No.: 18/513,082

(22) Filed: Nov. 17, 2023

(65) Prior Publication Data

US 2024/0168233 A1 May 23, 2024

(30) Foreign Application Priority Data

Nov. 18, 2022 (FR) ...................................... 2212044

(51) Int. Cl.
*G02B 6/34* (2006.01)
*G02B 6/10* (2006.01)
*G02B 6/12* (2006.01)
*G02B 6/124* (2006.01)

(52) U.S. Cl.
CPC ............... *G02B 6/34* (2013.01); *G02B 6/102* (2013.01); *G02B 6/12004* (2013.01); *G02B 6/124* (2013.01)

(58) Field of Classification Search
CPC ....... G02B 6/12004; G02B 6/124; G02B 6/34
See application file for complete search history.

(56) References Cited

U.S. PATENT DOCUMENTS 6,775,427 B2 * 8/2004 Evans ..................... H01S 5/187 372/102
9,588,289 B1 3/2017 Astier et al.
2013/0120749 A1 * 5/2013 Nicoletti ............ G01N 15/0211 356/338

(Continued)

FOREIGN PATENT DOCUMENTS

EP 4016054 A1 6/2022
JP 2012-208371 A * 10/2012
JP 2016-38446 A * 3/2016

OTHER PUBLICATIONS

Extended European search report for application 23210351.5, dated Mar. 27, 2024. (Year: 2024).*

*Primary Examiner* — Michael Stahl

(57) ABSTRACT

A photonic chip for scene illumination, the photonic chip comprises a substrate comprising a face with an etching, a plurality of waveguides extending parallel to a plane formed by the etched face of the substrate, each waveguide being configured to guide at least one light beam, a plurality of diffraction gratings, respectively formed in a waveguide and each being configured to extract, out of the waveguide in which it is formed and towards the etching of the substrate, the light beam propagating in said waveguide, at least two waveguides being configured to receive light beams of different wavelengths, and wherein the etching of the substrate is configured to extract the light beams out of the substrate, towards the scene to be illuminated, said scene lying against the etched face of the substrate and at the level of the etching of the substrate.

12 Claims, 4 Drawing Sheets

(56) References Cited

U.S. PATENT DOCUMENTS

| | | | | |
|---|---|---|---|---|
| 2013/0182998 | A1* | 7/2013 | Andry | G02B 6/4204 385/33 |
| 2013/0209026 | A1* | 8/2013 | Doany | G02B 6/32 438/32 |
| 2019/0004247 | A1* | 1/2019 | Huang | G02B 6/12002 |
| 2019/0339197 | A1* | 11/2019 | Boutami | G01N 21/51 |
| 2020/0033244 | A1* | 1/2020 | Boutami | G01N 21/53 |
| 2020/0218012 | A1* | 7/2020 | Wang | G02B 6/34 |
| 2022/0196895 | A1 | 6/2022 | Monpeurt et al. | |
| 2022/0196901 | A1 | 6/2022 | Monpeurt et al. | |
| 2022/0299709 | A1* | 9/2022 | Kuo | G02B 6/32 |

* cited by examiner

PHOTONIC CHIP AND INFRARED IMAGING SYSTEM USING SUCH A PHOTONIC CHIP

CROSS-REFERENCE TO RELATED APPLICATION

This application claims the priority to French application No. FR2212044 filed on Nov. 18, 2022, the contents of which are incorporated by reference.

FIELD OF THE INVENTION

The present invention relates to a photonic chip and to an infrared imaging system using such a photonic chip. More specifically, the photonic chip is designed to illuminate a scene in the mid-infrared spectral range, for multispectral infrared spectroscopy applications.

BACKGROUND OF THE INVENTION

In the field of photonic chips and mid-infrared imaging systems, EP4016054 describes a silicon-integrated optical component for attenuated total reflection imaging for infrared spectroscopy applications. The optical component comprises a supporting substrate and at least two waveguides superimposed on one another in two parallel planes, so that each waveguide is dedicated to receiving and sending a specific and different wavelength. For each waveguide, a light source sends light of a predetermined wavelength. The waveguides include an associated diffraction grating for extracting light from the waveguide to illuminate a sample positioned on a top surface of the substrate. The light extracted from the waveguide is directed onto the substrate surface at the sample. The light is totally reflected at the interface between the substrate surface and the sample. The reflected light is directed towards a matrix detector, which analyzes the light it receives to obtain information about the sample.

A first drawback of this document is that the component described is suitable only for attenuated total reflection. However, in some cases, other measurement modes are preferable, such as reflection, transmission and/or transflection. A second drawback of this document is that the superimposed arrangement of the waveguides can lead to integration problems, or even manufacturing difficulties.

EP4016053 describes a silicon integrated optical component for mid-infrared interferometric imaging. The component comprises an arm comprising a waveguide with an associated diffraction grating and a second arm also comprising a waveguide with an associated diffraction grating. The waveguides lie in the same plane and are configured to extract light from their respective arms towards a reflective surface and a sample surface to be analyzed, respectively, located between the two arms. In this way, a phase image of the sample can be made from the light beam that has interacted with the sample and a light beam that has not interacted with the sample but has been reflected by the reflecting surface.

One disadvantage of the component described in this document is that it is specifically adapted to the interferometry of two beams of the same wavelength for the analysis of a sample. A second disadvantage is that it requires the joint use of two samples, one for each arm, to perform the analysis.

The present invention seeks to at least partially solve the above-mentioned problems.

BRIEF SUMMARY OF THE INVENTION

Thus, the invention relates to a photonic chip for scene illumination, the photonic chip comprising:

- a substrate comprising a face with an etching,
- a plurality of waveguides extending parallel to a plane formed by the etched face of the substrate, each waveguide being configured to guide at least one light beam,
- a plurality of diffraction gratings, each diffraction grating being respectively formed in a waveguide of the plurality of waveguides and each diffraction grating being configured to extract, out of the waveguide in which it is formed and towards the etching of the substrate, the light beam propagating in said waveguide, at least two waveguides being configured to receive light beams of different wavelengths, and wherein the etching of the substrate is configured to extract the light beams out of the substrate, towards the scene to be illuminated, said scene lying against the etched face of the substrate and at the level of the etching of the substrate.

Thus, the photonic chip according to the invention is configured, on the one hand, to illuminate a scene by means of light beams of different wavelengths. In addition, the distribution of the waveguides around the etching of the substrate and in the same plane facilitates fabrication and integration of the photonic chip into a larger lighting system. Finally, the specific configuration of the photonic chip enables the light beam extracted from the substrate to be reflected onto the stage, which is located at the etching of the substrate. The light beam reflected by the scene can then be analyzed.

The invention also relates to an imaging system comprising:

- a photonic chip,
- at least one illumination module configured to emit a plurality of light beams belonging, wherein at least two of the plurality of light beams have different wavelengths, the light beams being injected into the photonic chip's waveguides,
- a scene, said scene being located at the etching of the substrate level, and
- an imaging module.

According to different aspects, it is possible to provide the one and/or the other of the characteristics below taken alone or in combination.

- the etching of the substrate is configured to be formed by an isotropic etching of the substrate, so that the etching forms a circle according to a top view of the substrate.
- the etching of the substrate is configured to be formed by an anisotropic etching of the substrate, such that said etching of the substrate forms a polygon when viewed from above the substrate.
- each diffraction grating is positioned around the etching of the substrate along a plane of symmetry of said substrate, said plane of symmetry being perpendicular to the plane formed by the etched face of the substrate.

The result is a homogeneous illumination of the scene. Furthermore, considering the isotropic etching, which has the shape of a circle when viewed from above, a very large number of waveguides and light beams can be envisaged due to the central symmetry of such a geometric figure.

The chip further comprises an input waveguide into which all the light beams are intended to be injected, the photonic chip further comprising at least one demultiplexer configured to demultiplex the light beams at the output of the input waveguide so as to inject at least one light beam into at least two waveguides of the plurality of waveguides.

This means that only one illumination module emitting the light beams can be used, which is advantageous if the photonic chip is to be used in a reduced-size system.

The chip further comprises a plurality of input waveguides into each of which a portion of the light beams is intended to be injected, the photonic chip further comprising as many demultiplexers as input waveguides, each demultiplexer being associated with an input waveguide, the demultiplexers being configured to demultiplex the light beams at the output of the input waveguide so as to inject at least one light beam into waveguides of the plurality of waveguides.

the waveguides are designed to receive light beams in the mid-infrared range.

at least one waveguide among the plurality of waveguides is configured to receive at least two light beams of different wavelengths.

The number of waveguides can be limited, while the number of different wavelengths can be increased. The chip is therefore an efficient and compact system.

The thickness of the photonic chip is equal to the working distance between the imaging module and the scene.

The photonic chip acts as a spacer.

the working distance between the imaging module and the stage is of the same order of magnitude as the length of a surface of the stage to be illuminated, the working distance being between 100 μm and 1.5 mm.

No additional optical device such as a lens is required.

Light beams are in the infrared range.

BRIEF DESCRIPTION OF THE DRAWINGS

Embodiments of the invention will be described below with reference to the drawings, described briefly below.

Figure 1A:
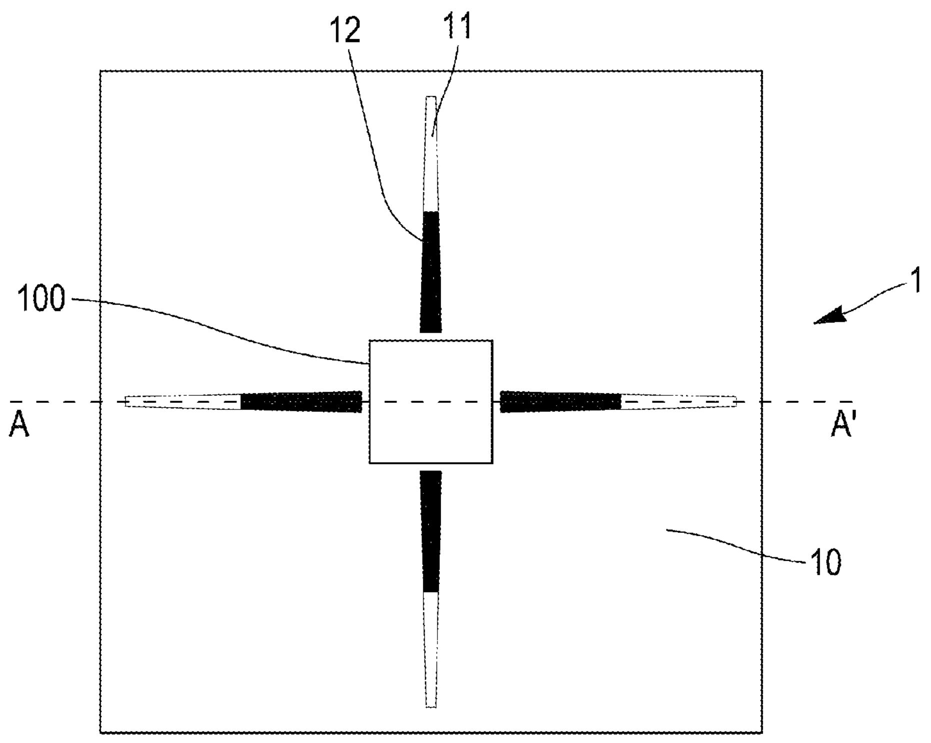
FIG. 1A is a top view of a photonic chip according to one embodiment.

In the drawings, identical references designate identical or similar objects.

DETAILED DESCRIPTION OF THE INVENTION

Figure 1B:
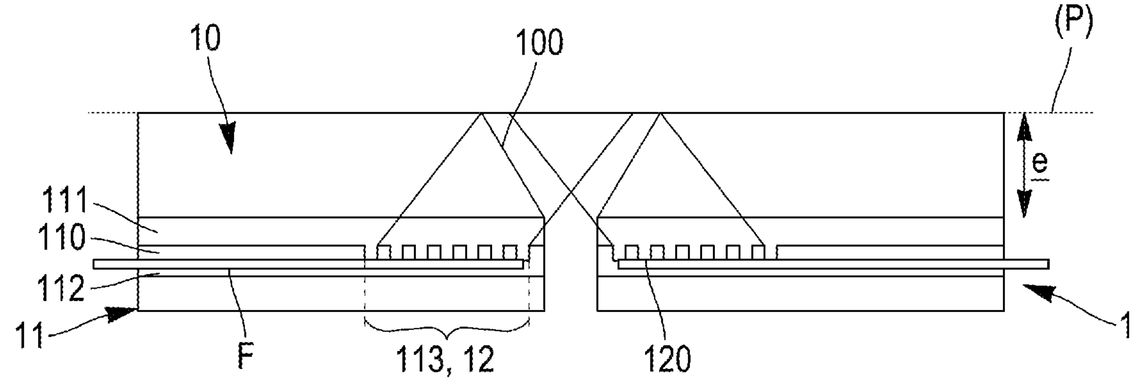
FIG. 1B is a cross-sectional view of the photonic chip of FIG. 1A along axis AA'.
Figure 2A:
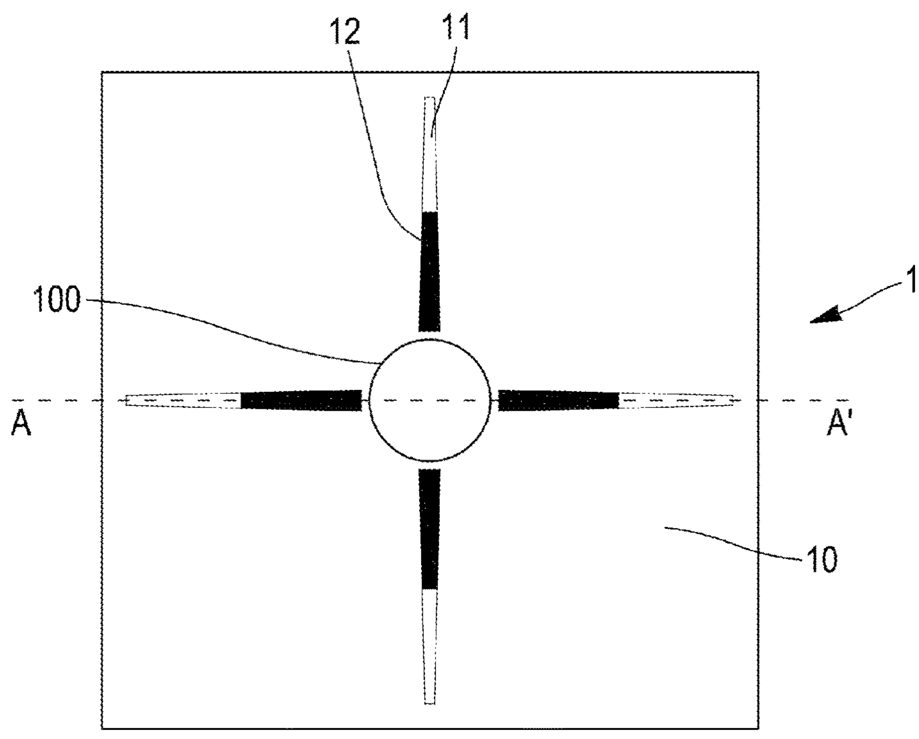
FIG. 2A is a top view of a photonic chip according to another embodiment.
Figure 2B:
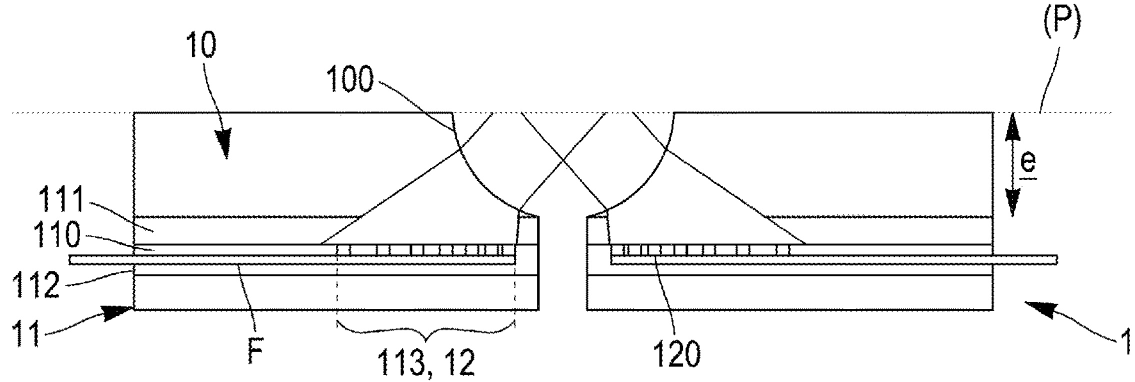
FIG. 2B is a cross-sectional view of the photonic chip of FIG. 2A along axis AA'.

FIGS. 1A and 1B illustrate a photonic chip 1 in one embodiment, and FIGS. 2A and 2B illustrate a photonic chip 1 in another embodiment.

Photonic chip 1 is a lighting photonic chip, designed to combine light beams in the infrared range to illuminate a scene.

In the description, the term infrared used in the text refers to a part of the light spectrum belonging to a spectral band ranging from 0.78 μm to 50 μm, and preferably ranging from 2 μm to 12 μm.

The photonic chip 1 comprises a substrate 10. The substrate 10 is a crystalline silicon substrate. The thickness e of the substrate is advantageously between 100 μm and 1.5 mm, as will be explained below. To obtain the desired thickness e, the substrate can be thinned.

The substrate 10 has at least one etching 100 forming an etching 100 of the substrate 10, where light is extracted from the photonic chip 1. Advantageously, the scene to be illuminated is located at the level of the etching 100 of substrate 10.

As shown in FIGS. 1A and 1B, the etching 100 can be obtained by an anisotropic etching of the substrate. Advantageously, the etching 100 forms a parallelogram, advantageously a square, a rectangle or an octagon, as seen from above (FIG. 1A). In this embodiment, the etching 100 of the substrate corresponds to the square formed by the etchings 100 on the substrate 10, as seen from above.

The principle of anisotropic etching forming an octagon seen from above is described in the scientific article by Rola, Krzysztof P., Konrad Ptasiński, Adrian Zakrzewski, and Irena Zubel. 2014. "Silicon 45° Micromirrors Fabricated by Etching in Alkaline Solutions with Organic Additives". Microsystem Technologies 20(2): 221-26.

In FIGS. 2A and 2B, the etching 100 is obtained by an isotropic etching of the substrate, so that when viewed from above, the etching 100 has the shape of a circle. In this embodiment, the etching 100 of the substrate corresponds to the circle formed by the etchings 100 on substrate 10 when viewed from above.

In both these embodiments, the scene to be illuminated is at the level of the etching of the substrate 100 formed by the etchings 100.

The photonic chip also comprises at least one waveguide 11, and preferably a plurality of waveguides 11. The waveguides 11 are linear waveguides suitable for guiding a light beam F propagating in said waveguides 11. The waveguides 11 are formed by a core 110 in which the light beam F travels, and a cladding 111, ensuring a desired optical index difference between the core and the medium surrounding the core. In the case of the illustrated waveguides, each guide comprises a core 110 sandwiched between two claddings 111. The light beam F is guided into the core 110 by successive reflections at the interfaces between the core 110 and each of the claddings 111 between which the core 110 is interposed.

Advantageously, the cores 110 of the waveguides 11 are made of germanium and the claddings 111 are made of silicon germanium. The waveguides 11 are inscribed on the substrate 10. In a first configuration, the waveguides 11 are configured to guide a single light beam of a particular wavelength. Advantageously, at least two waveguides 11 among the plurality of waveguides are respectively configured to guide light beams of different wavelengths, so that the photonic chip 1 is suitable for multispectral illumination in the infrared.

According to a second configuration, which may come as an alternative to or in addition to the first configuration described above, at least one waveguide 11 or a majority of waveguides 11 or all waveguides 11, are suitable for guiding several light beams F. In this configuration, a waveguide 11 may be suitable for guiding two light beams of identical wavelength or of different wavelengths, if the wavelengths of the light beams propagating in the waveguide are close. In one example, two wavelengths are considered close if their difference is less than or equal to 0.3 μm.

Advantageously, the waveguides 11 are monomodal for all the wavelengths of light beams F considered. More precisely, waveguides 11 are monomodal at the smallest wavelength considered.

A diffraction grating is formed in each waveguide, the pitch of which may be constant or variable, depending on the type of etching. For isotropic etching, the pitch is variable to enable a collimated beam to emerge from the substrate, despite the concave profile of the etching. For anisotropic etching, on the other hand, a constant pitch ensures beam collimation, as the etching profile is straight.

The waveguides 11 entrance an entrance zone 112 and an exit zone 113. The waveguides 11 receive a light beam at their entrance zone 112. Typically, such a light beam is injected from an illumination module comprising at least one light source, which will be described in more detail below. The light beam F then propagates through the waveguide as described above to the exit zone 113, where the light beam is extracted from the waveguide 11.

The exit zone of the waveguides corresponds to the diffraction grating associated with the waveguide in question, the diffraction grating allowing the light beam to be extracted from the waveguide, towards the etching of the substrate.

The thickness of all waveguides 11 of the photonic chip 1 can be the same, for ease of fabrication. The thickness of the waveguides 11 can be between 500 nm and 3 μm.

Alternatively, the entrance and/or exit zones 112, 113 of the waveguides 11 may have, as seen from above, a rectangular parallelepiped, prismatic or adiabatic shape to facilitate light injection into the waveguide or its extraction from the waveguide. The width of a waveguide 11 can therefore be variable at its entrance and/or exit zones 112, 113. In this configuration and in order to ensure monomodal waveguide 11, the width of waveguide 11 in its narrowest part is between 500 nm and 3 μm. In the widest part of waveguide 11, the width of waveguide 11 is between the value of the narrowest width (e.g. 500 nm) and the size of the area to be illuminated.

In one embodiment, the waveguides 11 extend linearly in a single plane, intended to be parallel to a plane P formed by the etched face of the substrate.

By "plane P formed by the etched face" is meant the flat face of the substrate in which the etching has been performed. The etching itself is not taken into account in defining the P plane formed by the etched face of the substrate.

In one embodiment, the diffraction gratings of each waveguide 11 are positioned around the etching of the substrate 10 along a plane of symmetry of the substrate 10, said plane of symmetry being perpendicular to the plane formed by the etched face of the substrate.

In FIGS. 1A, 1B and 2A, 2B, the waveguides 11 are positioned entirely symmetrically with respect to the etching of the substrate 100. In other words, the waveguides 11 extend symmetrically from their entrance zone 112 to their exit zone 113.

Figure 3:
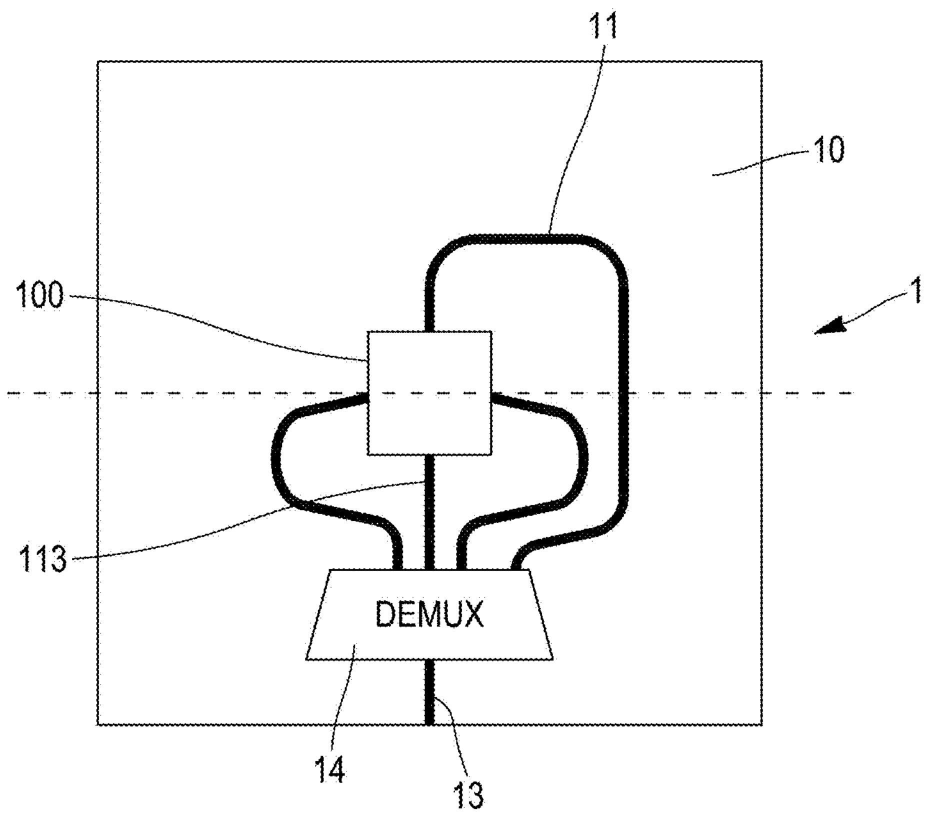
FIG. 3 is another embodiment of a photonic chip.

FIG. 3 illustrates a variant in which a photonic chip 1 is shown in top view. The photonic chip 1 comprises an etching 100 obtained by an anisotropic etching of the substrate, although the embodiment shown in FIG. 3 is also applicable in the case where the etching is obtained by an isotropic etching of the substrate.

In this variant, the photonic chip comprises, in addition to the plurality of waveguides 11, an input waveguide 13. This input waveguide 13 is intended to receive the plurality of light beams F. The photonic chip comprises a demultiplexer 14, associated with the input waveguide 13. The demultiplexer 14 is configured to inject at least one light beam into each of the associated plurality of waveguides 11. All waveguides 11 extend in a single plane, intended to be parallel to the plane (P) of the etched face of the substrate. The diffraction gratings of the waveguides are positioned around the etching of the substrate, according to a plane of symmetry of the etching perpendicular to the plane (P) formed by the etched face of the substrate.

Advantageously, the number of waveguides 11 is equal to the number of wavelengths in the wavelength range under consideration. Alternatively, at least one waveguide 11 may be associated with two different wavelengths if they are close, for example if the wavelength difference is less than or equal to 0.3 μm.

In this embodiment, the input waveguide 13 is monomodal for the smallest wavelength considered, and therefore for the entire wavelength range considered.

Advantageously, the thickness of the input waveguide 13 and the plurality of waveguides 11 is the same, to facilitate fabrication of the photonic chip 1. The input waveguide 13 can be parallelepipedic, rectangular, prismatic or adiabatic in shape, to facilitate the injection of light beams into the input waveguide 13.

Demultiplexer 14 can be AWG (Arrayed Waveguide Grating), PCG (Planar Concave Grating), MZI (Mach-Zehnder Interferometer), MZI (Mach-Zehnder Interferometer) or PCG (Planar Concave Grating). PCG ("Planar Concave Grating"), MZI ("Mach-Zehnder Interferometer") or MMI ("MultiModal Interference coupler") type.

In all the embodiments described above, each waveguide 11 is associated with a diffraction grating 12 for extracting light from the associated waveguide 11. Each diffraction grating 12 is optimized for a particular wavelength. The diffraction gratings 12 have pitches 120, which may be constant or variable. The order of magnitude of the pitches 120 of the diffraction gratings 12 is between a micron and a few microns. The pitches 120 are chosen to enable the light beam F to be extracted from the waveguide 11 associated with the diffraction grating 12 in question.

As a result, the exit zones 113 of the cores 110 of the waveguides 11 correspond to the zones where the diffraction gratings 12 are provided.

The light beams extracted by the diffraction gratings 12 from the waveguides 11 are directed towards the etching 100 of the substrate 10 so as to reach the scene to be illuminated.

According to Snell-Descartes' law of refraction, the critical angle beyond which the light beams resulting from refraction of the refraction gratings 12 will undergo total internal reflection and cannot effectively exit the substrate 10 and illuminate the scene is around 17° in the wavelength range under consideration, silicon being very little dispersive in the infrared. As a result, the light beams generated by grating diffraction must fall within a cone with an angle of ±17° to the normal to the silicon/air diopter.

The light beams extracted by the diffraction gratings 12 propagate equally in two opposite directions, towards the substrate 10 and towards the upper cladding 111. Consequently, if the extraction angle is greater than the critical angle of 17°, or if the etched face of the substrate 10 is metallized, the thickness of the upper cladding 111 at the exit zone 113 of core 110 is determined so as to obtain, at the wavelength of use, constructive interferences between the light beam extracted from the upper cladding 111 and the light beam resulting from reflection on the etched face of substrate 10.

To enable the light beams to be effectively extracted from the substrate 10 towards the scene to be illuminated, the etching angle of the substrate in the case where etching is obtained by anisotropic etching of the substrate (FIGS. 1A and 1B) is determined by the silicon crystal planes forming the substrate 10.

For example, the etching can be carried out on the crystal planes ·{111}· using a substrate ⟨100⟩, in which case the etching angle is 54.74°.

In another example, the etching angle is equal to 45° by using a substrate ⟨100⟩.

Figure 4:
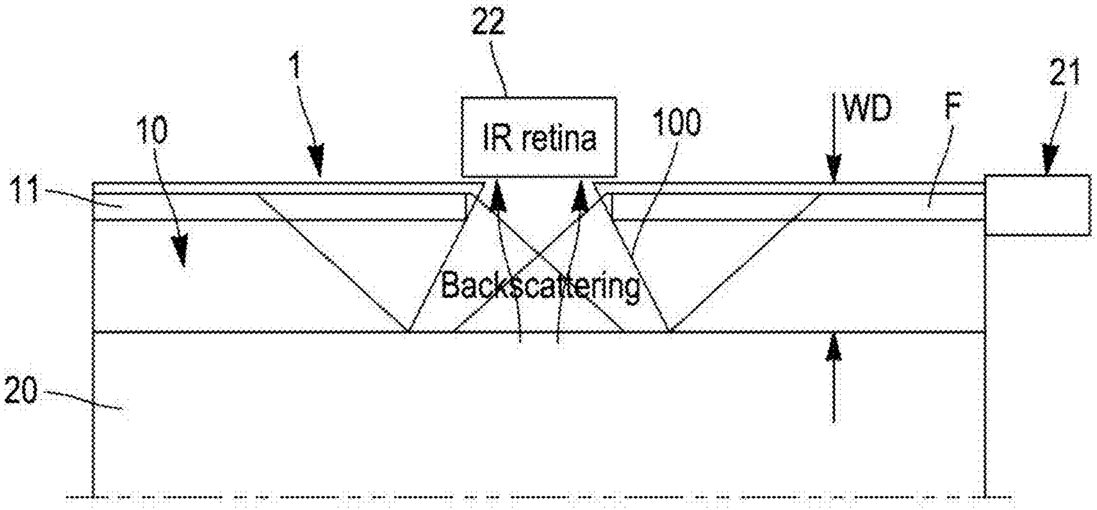
FIG. 4 is a general view of an infrared imaging system using a photonic chip in one embodiment.

The pitch 120 of the diffraction gratings 12 can then be advantageously constant and chosen so that at the wavelength of use the angle of extraction after refraction is equal to the desired angle of incidence on the scene to be illuminated, which is intended to be at the level of the etching of the substrate, see FIG. 4.

The pitch 120 of the diffraction gratings 12 is then chosen as follows:

$$p = \frac{\lambda}{n_{eff} - n_{SiGe}\sin(\theta_{SiGe})}$$

Where λ is the wavelength of use or the median wavelength of use, neff is the effective mode index at wavelength λ, nSiGe is the index of the Silicon Germanium cladding 111 and θSiGe is the extraction angle considered in Silicon Germanium. To obtain the extraction angle in air θair, simply use the Snell-Descartes law.

In this variant, since the light beams extracted by the diffraction gratings 12 are collimated, the length of the diffraction gratings 12 depends on the characteristic length of the surface to be illuminated and the extraction angle θair.

Figure 5:
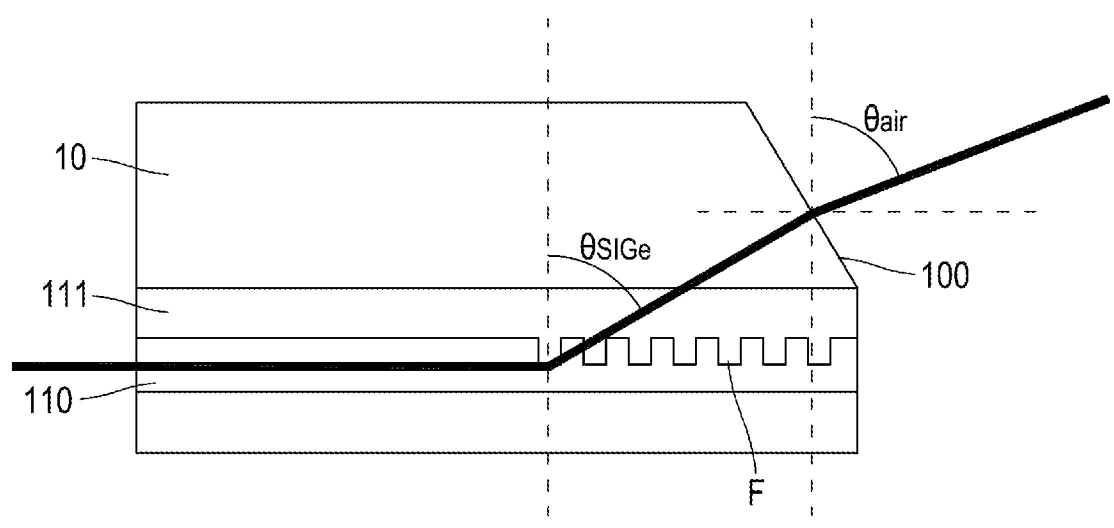
FIG. 5 illustrates the extraction of a light beam according to one embodiment.

This embodiment is illustrated in FIG. 5.

In a particular case, if the extraction angle of the diffraction gratings 12 is chosen so that the light beam arrives perpendicularly on the flanks of the etching 100, then the length of the diffraction gratings 12 is equal to the characteristic length of the surface of the scene to be illuminated.

Optionally, the flanks of etching 100 obtained by anisotropic etching of the substrate can be anti-reflective treated to limit Fresnel losses at the Silicon/air interface. The anti-reflective treatment applied is, for example, the deposition of a thin layer of ZnS. The anti-reflective coating is optimized for a particular wavelength within the wavelength range of use, for example the median wavelength of use. The thickness of the anti-reflective layer is, for example, equal to a quarter of the median wavelength of use, typically between 1 and 3 μm.

Considering the case where the etching is obtained by isotropic etching of the substrate (FIGS. 2A and 2B), the profile of etching 100 visible in FIG. 2B is curved, concave and divergent. The profile is not completely circular, as etching 100 is more effective in the vertical direction than in the horizontal.

Advantageously, in this embodiment, the pitch 120 of the diffraction gratings 12 is not constant and the extraction angle θSiGe is not constant either, in order to obtain a light beam collimated off the substrate 10, taking into account the concave diopter of the etched face, acting as a diverging lens.

The pitch 120 of gratings 12 is chosen so that at the wavelength of use and at each pattern of diffraction gratings 12, the angle of extraction after refraction is equal to the desired angle of incidence on the scene. The variable pitch 120 is then chosen using the law of first-order gratings.

In this variant, the length of the diffraction gratings 12 depends on the characteristic length of the surface of the scene to be illuminated, the extraction angle θair and the profile of the etching 100 when obtained by isotropic etching of the substrate.

In particular, the order of magnitude of the variable pitch 120 of gratings 12 for the wavelengths considered is microns, or even a few microns. For each etching variant, the filling factor is determined so as to homogenize the illumination over the scene, compensating for the exponential law of the Beer-Lambert principle. The fill factor is chosen to increase as a function of the position of the grating pattern 12, in the direction of light propagation.

Optionally, the flanks of this 100 etching can be anti-reflective treated to limit Fresnel losses at the interface between the silicon substrate and the air. The anti-reflective treatment applied is, for example, a deposition of a thin layer of ZnS. The anti-reflective coating is optimized for a particular wavelength within the wavelength range of use, for example the median wavelength of use. The thickness of the anti-reflective layer is, for example, equal to a quarter of the median wavelength of use, typically between 1 and 3 μm.

FIG. 4 illustrates an infrared imaging system 2 comprising a photonic chip 1 as described above. The photonic chip illustrated comprises an etching 100 formed by an anisotropic etching of the substrate, although all the embodiments described above are applicable to system 2.

System 2 is used to image a surface of a scene 20.

System 2 comprises at least one illumination module sending light beams F in the infrared range in the wavelength range under consideration (between 2 μm and 12 μm). The illumination module comprises at least one light source 21, and advantageously a plurality of light sources, each capable of emitting at least one light beam. The light sources 21 may be quantum cascade lasers (QCL), interband cascade lasers (ICL), or external or internal cavity lasers. At least two light beams have different wavelengths, enabling multispectral application.

Advantageously, at least one light beam is injected per waveguide 11. In a particular application, several light beams can be injected into a waveguide if their respective wavelengths are close. In one example, two wavelengths are considered close if their difference is less than or equal to 0.3 μm.

System 2 also includes an infrared imaging module 22. Module 22 may comprise a retina, for example a matrix of infrared photodetectors such as a matrix of semiconductor photodiodes or a matrix of microbolometers. The lateral dimensions of module 22 are of the order of a millimeter or a few millimeters. Module 22 is advantageously located at a short working distance, WD, of between 100 μm and 1.5 mm, so as to produce an image of the scene to be illuminated 20, without a lens or other optical imaging system. The working distance WD is defined as the distance between the scene 20 and the module 22.

The photonic chip 1 as described enables the light beams from the light sources 21 to be combined and brought towards the scene 20 to evenly illuminate its surface.

Advantageously, the surface area of the scene 20 to be illuminated is of the order of magnitude of the lateral dimensions of the imaging module 22, i.e. of the order of a millimeter or a few millimeters.

As shown in FIG. 4, the photonic chip 1 is located between the scene 20 and the module 22. More specifically, the surface to be illuminated on stage 20 is located at the level of the etching 100 on substrate 10 of photonic chip 1.

Advantageously, the thickness of the photonic chip in the illustrated system 2 is equal to the working distance WD, so that the photonic chip 1 is suitable for acting as a spacer between the imaging module 22 and the stage 20.

The photonic chip 1 is manufactured by known means. In particular, a crystalline silicon substrate is provided which can be thinned to achieve the desired working distance WD. Silicon-germanium epitaxy is carried out for a first cladding 111, and Germanium epitaxy for the core 110. This is followed by chemical-mechanical polishing. The Germanium is then partially anisotropically etched to produce diffraction gratings 12. Silicon-germanium epitaxy is then performed to obtain the second sheath 111 surrounding the core 110. The stack of cladding 111 and core 110 is anisotropically etched. The overall stack is turned upside down, followed by an anisotropic or isotropic 100 etching of the silicon 10 substrate.

The invention claimed is:

1. A photonic chip for scene illumination, the photonic chip comprising:

a substrate comprising a face with an etching, a plurality of waveguides extending parallel to a plane formed by the etched face of the substrate, each waveguide being configured to guide at least one light beam, a plurality of diffraction gratings, each diffraction grating being respectively formed in a waveguide of the plurality of waveguides and each diffraction grating being configured to extract, out of the waveguide in which it is formed and towards the etching of the substrate, the light beam propagating in said waveguide, at least two waveguides being configured to receive light beams of different wavelengths, and wherein inner surfaces of the substrate forming the etching are configured to extract the light beams out of the substrate, towards the scene to be illuminated, said scene lying against the etched face of the substrate and at the level of the etching of the substrate.

2. The photonic chip according to claim 1, wherein the etching of the substrate is configured to be formed by an isotropic etching of the substrate, so that the etching forms a circle according to a top view of the substrate.

3. The photonic chip according to claim 1, wherein the etching of the substrate is configured to be formed by an anisotropic etching of the substrate, such that said etching of the substrate forms a polygon when viewed from above the substrate.

4. The photonic chip according to claim 1, wherein each diffraction grating is positioned around the etching of the substrate along a plane of symmetry of said substrate, said plane of symmetry being perpendicular to the plane formed by the etched face of the substrate.

5. The photonic chip according to claim 1, wherein the photonic chip further comprises an input waveguide into which all the light beams are intended to be injected, the photonic chip further comprising at least one demultiplexer configured to demultiplex the light beams at the output of the input waveguide so as to inject at least one light beam into at least two waveguides of the plurality of waveguides.

6. The photonic chip according to claim 1, wherein the photonic chip further comprises a plurality of input waveguides into each of which a portion of the light beams is intended to be injected, the photonic chip further comprising as many demultiplexers as input waveguides, each demultiplexer being associated with an input waveguide, the demultiplexers being configured to demultiplex the light beams at the output of the input waveguide so as to inject at least one light beam into waveguides of the plurality of waveguides.

7. The photonic chip according to claim 1, wherein the waveguides are designed to receive light beams in the mid-infrared range.

8. The photonic chip according to claim 1, wherein at least one waveguide among the plurality of waveguides is configured to receive at least two light beams of different wavelengths.

9. An imaging system comprising:

a photonic chip according to claim 1, at least one illumination module (21) configured to emit a plurality of light beams, wherein at least two of the plurality of light beams have different wavelengths, the light beams being injected into the photonic chip's waveguides, a scene, said scene being located at the level of the etching of the substrate, and an imaging module.

10. The imaging system according to claim 9, wherein a thickness of the photonic chip is equal to a working distance between the imaging module and the scene.

11. The imaging system according to claim 10, wherein the working distance between the imaging module and the scene is of the same order of magnitude as a length of a surface of the scene to be illuminated, the working distance being between 100 μm and 1.5 mm.

12. The imaging system according to claim 9, wherein the light beams are in the infrared range.

* * * * *